(12) United States Patent
Giampavolo et al.

(10) Patent No.: US 8,528,916 B2
(45) Date of Patent: Sep. 10, 2013

(54) SHOPPING CART INFANT SEAT

(75) Inventors: Paul Giampavolo, Newton, NJ (US);
Christopher M. Johnson, Glen Allen, VA (US)

(73) Assignee: Safe-Strap Company, Inc., Wharton, NJ (US)

(*) Notice: Subject to any disclaimer, the term of this patent is extended or adjusted under 35 U.S.C. 154(b) by 669 days.

(21) Appl. No.: 12/618,201

(22) Filed: Nov. 13, 2009

(65) Prior Publication Data

US 2011/0115176 A1 May 19, 2011

(51) Int. Cl.
*B62B 5/08* (2006.01)

(52) U.S. Cl.
USPC .................... 280/33.993; 297/256.17

(58) Field of Classification Search
USPC .......... 280/47.35, 47.38, 47.4, 47.41, 33.991, 280/33.992, 33.993; 297/256.17
See application file for complete search history.

(56) References Cited

U.S. PATENT DOCUMENTS

| | | | | |
|---|---|---|---|---|
| 4,403,807 A | * | 9/1983 | Wilkinson et al. | 297/188.1 |
| 4,598,945 A | * | 7/1986 | Hopkins | 297/256.17 |
| 4,834,404 A | * | 5/1989 | Wood | 280/33.993 |
| 4,861,105 A | * | 8/1989 | Merten et al. | 297/256.17 |
| 4,958,887 A | * | 9/1990 | Meeker | 297/256.17 |
| 4,971,343 A | * | 11/1990 | Wood | 280/33.993 |
| 5,056,865 A | * | 10/1991 | Sedlack | 297/256.17 |
| 5,058,283 A | * | 10/1991 | Wise et al. | 33/371 |
| 5,277,473 A | * | 1/1994 | Kelly et al. | 297/250.1 |
| 5,551,751 A | * | 9/1996 | Sedlack et al. | 297/256.13 |
| 5,611,597 A | * | 3/1997 | Lanz | 297/256.17 |
| 5,927,806 A | * | 7/1999 | Ohlson | 297/256.17 |
| 7,992,882 B2 | * | 8/2011 | Engelman | 280/79.2 |
| D648,501 S | * | 11/2011 | Giampavolo et al. | D34/27 |
| 8,235,400 B2 | * | 8/2012 | Gibson | 280/33.993 |

FOREIGN PATENT DOCUMENTS

WO WO 97/45312 12/1997

OTHER PUBLICATIONS

"Shopping Trolley with "Comfort" Baby Chair", http://www.wanzl.com/default.asp?navid=551362&lid=En&oid=000&keywords=comfort, Feb. 18, 2010.
"Shopping Trolley with "Trend" Baby Chair", http://www.wanzl.com/default.asp?navid=551361&lid=En&oid=000&keywords=comfort, Feb. 18, 2010.
"Baby/child service", http://www.wanzi.com/default.asp?navid=551431&lid=En&oid=000&keywords=comfort, Feb. 18, 2010.

* cited by examiner

*Primary Examiner* — John Walters
*Assistant Examiner* — Brian Swenson
(74) *Attorney, Agent, or Firm* — Preti Flaherty Beliveau & Pachios LLP (57) ABSTRACT

An infant seat mounted on a shopping cart permits an infant to be carried while avoiding interference with a nesting function of the shopping cart. The infant seat includes a mounting plate that can be fastened to the shopping cart at a gate that can pivot about an axis to permit the infant seat to pivot with the gate during shopping cart nesting. The infant seat can be mounted to the shopping cart at a desired mounting angle with the optional use of wedges that have particular angles of inclination. The combination of wedges can be used to produce a desired mounting angle for different types of shopping carts to which the infant seat is fastened. Mounting angle indicia can be provided on the infant seat to help determine a proper or desired mounting angle for the infant seat. A gauge to determine a proper or desired mounting angle can be used with the indicia to obtain the desired mounting angle. The infant seat is weather resistant and provides a robust support for temporarily transporting an infant on a shopping cart.

17 Claims, 7 Drawing Sheets

SHOPPING CART INFANT SEAT

STATEMENT REGARDING FEDERALLY SPONSORED RESEARCH OR DEVELOPMENT

N/A

BACKGROUND OF THE INVENTION

The present disclosure relates to an infant seat for a shopping cart, and relates more particularly to an infant seat that can be mounted on a shopping cart at a selectable angle while permitting the shopping cart to retain a nestable feature.

Shopping carts typically have seats for children in an age range of from about 1 year to about 4½ years. The seats are often configured as part of the shopping cart frame, and are often designed to collapse toward a pivotable gate at a rear portion of the shopping cart, e.g., where a push handle is located. The seat configuration is collapsible to permit the shopping cart gate to pivot upward to allow the shopping cart to be nestable with other like shopping carts. The seat configuration provided with such shopping cart configurations are typically unsuitable for use with infants, such as may be the case with children under about 12 months of age.

Infant seats are available that are designed for portability, and include a handle for lifting and carrying the portable infant seat. Such infant seats are often designed to mate with a platform suitable for arrangement in a vehicle, so that an infant can be secured within a vehicle while being easily carried by hand outside the vehicle.

A number of portable infant seats are designed to permit the infant seat to be temporarily mounted on a shopping cart. The location for the infant seat is typically above the collapsible seat configuration, so that the infant seat rests on a back support portion of the collapsible child seat and rear wall of the shopping cart near the push handle. Typically, the design of the portable infant seat attempts to accommodate a number of different shopping cart models, where the shopping carts may have different shapes or dimensions for the supports that are to be used by the portable infant seat. Due to the vast variety of shopping cart configurations, it is generally the case that a given portable infant seat configuration will not be stably supported in every shopping cart model. This practicality can create challenges for the person(s) caring for an infant while attempting to use a shopping cart for shopping. Typically, a retailer or commercial environment may offer a single type of shopping cart for use by the customers. If a customer's infant seat does not stably mount to the particular shopping cart model that is available, the customer is left with several less desirable options. For example, the customer may choose to simply carry the portable infant seat while pushing the shopping cart resulting in a less than ideal shopping experience. Alternately, the customer may choose to place the infant seat in the basket of the shopping cart, where the infant seat is not well secured and may not be evenly supported. Indeed, portable infant seats are involved in about 4% of all shopping cart related injuries. It would be highly desirable to provide a safer, more secure infant seat for a shopping cart.

Infant seats have been installed permanently on shopping carts to overcome some of the drawbacks discussed above. For example, one known design provides a tubular metal frame on which a molded foam rubber seat is mounted, typically secured with nuts and bolts. The tubular metal frame is secured to the shopping cart, either on the collapsible seat portion, the pivotable gate, or the rear wall or another shopping cart structure generally in the region of the push handle. The tubular metal frame is typically secured to the shopping cart with U-bolts and nuts threaded onto the U-bolts.

The above-described infant seat has the advantage of being securely attached to the shopping cart to obtain a significant increase and stability for the infant seat. In addition, the shopping cart can typically nest with another shopping cart without interference from the appropriately mounted infant seat. However, such a shopping cart infant seat configuration has several challenges with regard to longevity and flexibility. The tubular metal frame is typically composed, at least in part, of a ferrous metal or alloy for reasons of practical cost and strength of the frame. Accordingly, the frame tends to have a relatively short lifespan, due to deterioration through corrosion or rusting. In addition, the tubular metal frame is generally configured in a fixed shape. The infant seat is therefore mounted at an angle that is generally determined by the relationship of the tubular frame to the portion of the shopping cart to which the tubular frame is mounted. Due to the wide variety of shopping cart configurations, the angle at which the infant seat is mounted can vary widely, leading to less than optimal conditions for supporting an infant on the shopping cart.

BRIEF SUMMARY OF THE INVENTION

The present disclosure provides an infant seat for a shopping cart that is generally weather resistant and can be mounted at a number of angular positions with respect to the shopping cart. The infant seat may be composed of weather resistant material, including plastic, metal, wood, fabric or other weather resistant materials. In accordance with one aspect, the infant seat is composed of a foam rubber material mounted to or over-molded on a generally rigid plastic frame. The frame includes structures for mounting the infant seat to the shopping cart, such as holes for bolts, screws or rivets, hooks, bosses, or other suitable structures for securing the infant seat to the shopping cart. The infant seat may be secured to the shopping cart with any type of known securing mechanism including weather resistant U-bolts with threaded nuts, for example.

According to an aspect of the present disclosure, a number of wedges are provided for positioning an infant seat at a desired angle with respect to the mounting region of the shopping cart. The wedges can be secured between the infant seat and the shopping cart, or secured to the infant seat or shopping cart. The wedges may have different inclinations or tapers, so that by selection of appropriate wedges, a desired angle for the infant seat to be mounted to the shopping cart is obtained.

According to another aspect of the disclosure, the wedges are shaped to mate or engage with cooperating shapes or structures on the infant seat or the shopping cart. By shaping the wedges to provide an engagement with the infant seat or shopping cart, the locating of the wedge can be made more stable or secure.

According to another aspect of the disclosure, the wedges that have different angles of inclination or taper can be engaged with each other and secured between the infant seat and the shopping cart or to the infant seat or shopping cart. When wedges that include different angles of inclination are combined, the resulting angle of inclination provides additional flexibility for forming an angle for the infant seat to be mounted to the shopping cart at a desired mounting angle. Different combined angles can be achieved by combining the wedges having different angles of inclination in different orientations to form a desired angle for mounting the infant seat to the shopping cart. A number of different wedges can be provided to permit a large number of permutations of angles based on different combinations of the differently angled wedges.

The wedges can be formed to have structures that permit the wedges to engage with each other in different orientations to permit the desired angle to be formed and easily maintained with an arbitrary combination of wedges. The wedges may also be formed with structures that permit the wedges to cooperatively engage structures on the shopping cart or infant seat so that the wedge combination can be maintained in a given location.

According to another aspect of the disclosure, the infant seat is provided with an integral device for adjusting a mounting angle of the infant seat mounted to the shopping cart. For example, a hinged mounting device can be used at an infant seat mounting site, such as at a fastening structure or mounting plate. The hinged device can be adjusted to protrude from the fastening structure or mounting plate a variable amount by being pivoted about the hinge. The hinged device can then be secured in place with the desired amount of protrusion using a fastener that may or may not be integral with the infant seat. When the hinged device is secured with the desired amount of protrusion, it provides a mounting angle for the infant seat in conjunction with being mounted on a shopping cart.

According to another aspect of the disclosure, the infant seat is provided with markings or structures that can contribute to obtaining a desired mounting angle for the infant seat on the shopping cart. For example, the infant seat may include two points or a line in the form of projections, openings, or markings to provide an indication of a desired mounting angle for the infant seat on the shopping cart. According to this aspect, the aligning structures or markings permit the infant seat to be aligned with a desired mounting angle using a leveling tool. A combination of wedges can be selected and installed to permit the infant seat to be mounted to the shopping cart at the desired angle. The wedge combination can be modified to change the mounting angle for the infant seat, and the angle can be checked using a leveling tool with the mounting angle indicator on the infant seat. Once the desired mounting angle is obtained based on the arrangement of one or more wedges, the infant seat can be mounted to the shopping cart at the desired angle, as indicated by the leveling indicator with the leveling tool. An infant seat can also be provided with an integral leveling device that remains on the infant seat in use.

BRIEF DESCRIPTION OF THE SEVERAL VIEWS OF THE DRAWINGS

Exemplary embodiments of the disclosed infant seat are described in greater detail below, with reference to the accompanying drawings, in which.

DETAILED DESCRIPTION OF THE INVENTION

Figure 1:
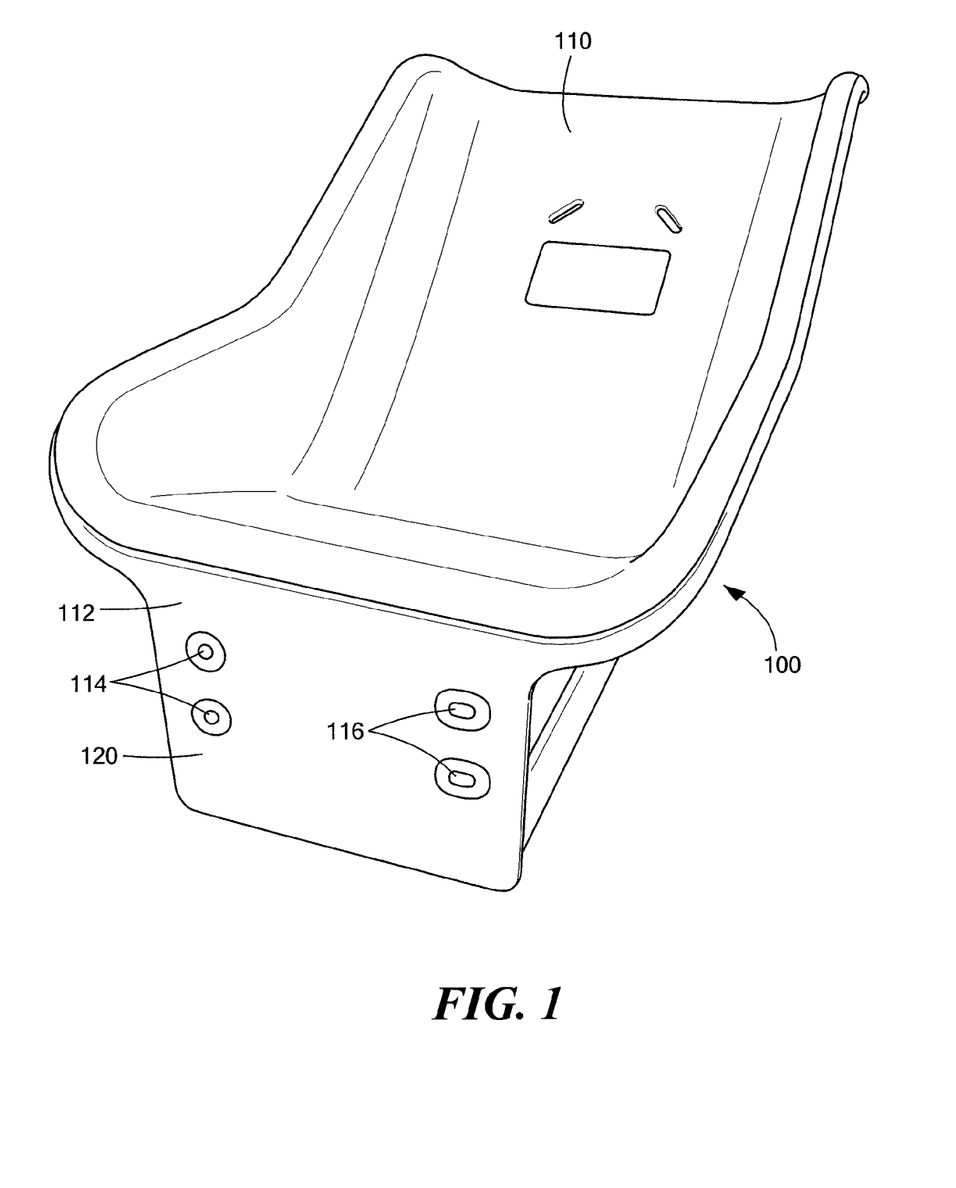
FIG. 1 is a perspective view of an embodiment of the infant seat in accordance with the present disclosure.
Figure 7:
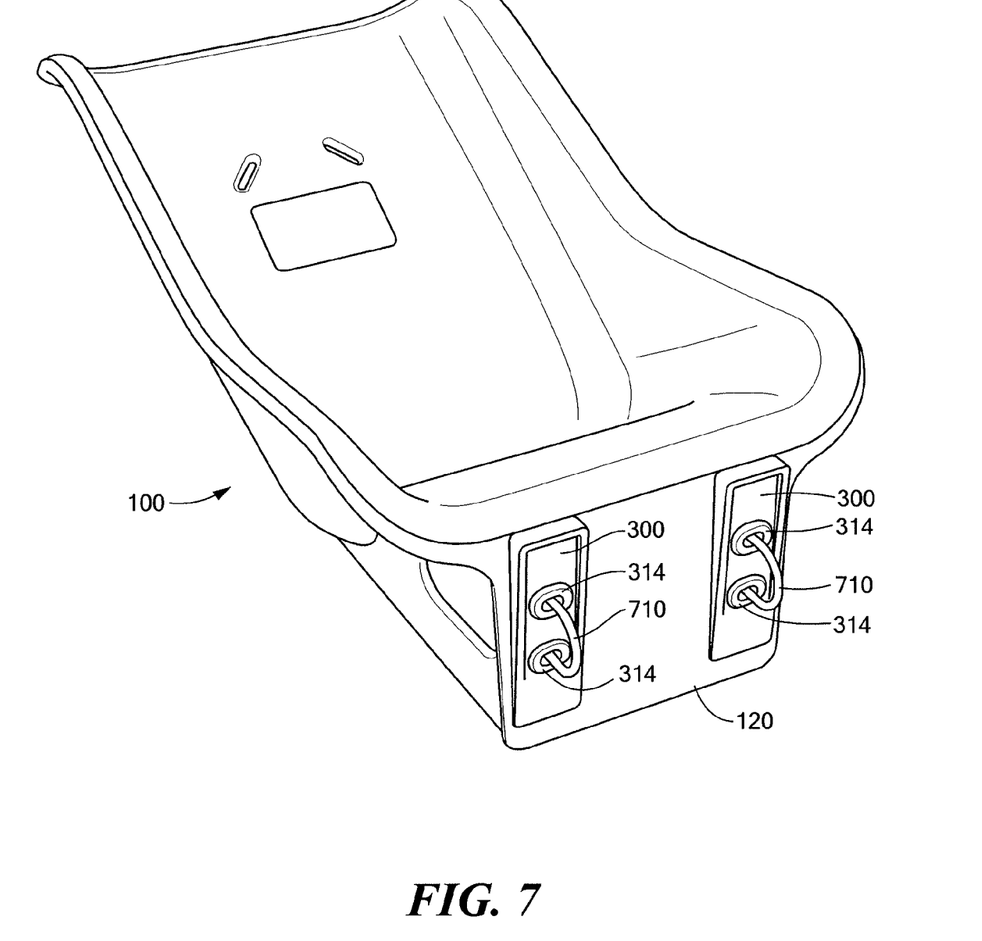
FIG. 7 is a perspective view of an infant seat showing wedges and fasteners according to an embodiment of the present disclosure.

Referring to FIG. 1, an embodiment of an infant seat 100 according to the present disclosure is illustrated. Infant seat 100 is configured to be mounted on a shopping cart, near a push bar of the shopping cart. Infant seat 100 is composed of a seat portion 110 and a frame 112. Seat portion 110 can be composed of foam rubber and over-molded onto frame 112. Frame 112 can be composed of a plastic or resin, such as polyethylene, or any other suitable material that is weather resistant and exhibits a sufficient rigidity to support infant seat 100. Frame 112 has structures for mounting infant seat 100 to a shopping cart using various types of fasteners. In the exemplary embodiment of FIG. 1, frame 112 includes through openings 114, 116 used to mount and fasten infant seat 100 to a shopping cart. Openings 114 and 116 are suitable for use with a U-bolt that can be passed through both of openings 114 and 116, respectively, as illustrated in FIG. 7. It should be apparent that many other types of fasteners may be generally used to attach infant seat 100 to a shopping cart in a desired orientation, which may include other types of fastening structures and devices. Openings 114 are circular through holes that can accept a bolt, screw or rivet, for example. Through openings 116 are slotted, and can also accept a fastener such as a bolt, screw or rivet, while allowing room for adjustment of the position of infant seat 100 on the shopping cart. For example, a fastener can be passed through openings 114 to secure infant seat 100 to a region of a shopping cart near a push bar while openings 116 permit the same function with a range of location for a fastening device to avoid instances where openings 116 may be occluded by portions of the shopping cart when a fastening device is passed through openings 114 to secure infant seat 100 to the shopping cart.

Figure 2:
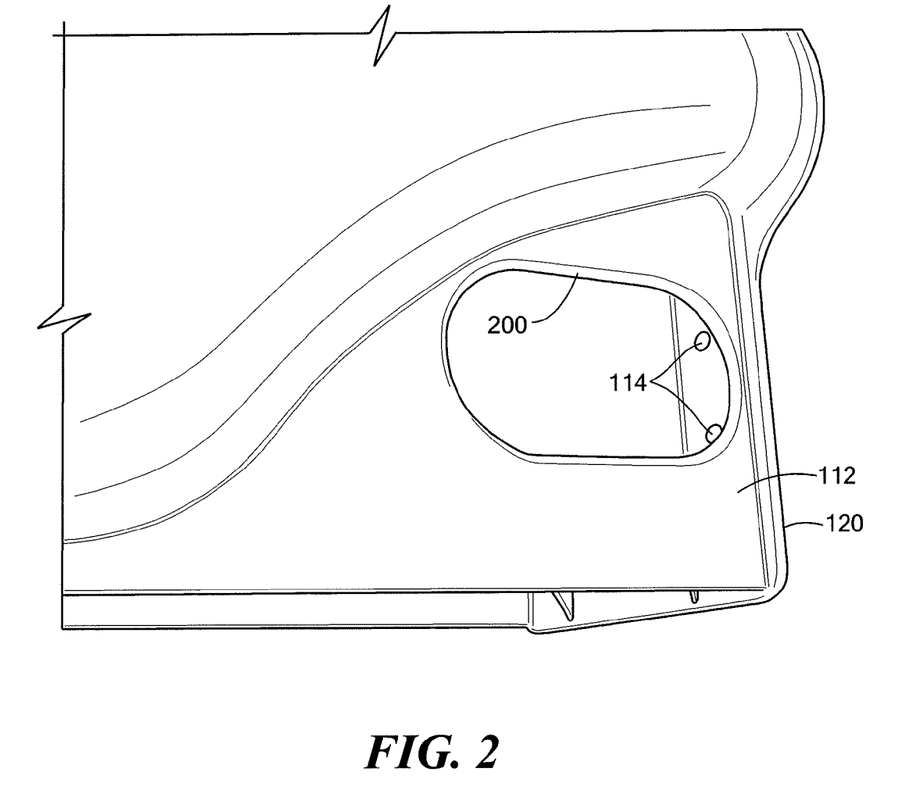
FIG. 2 is a cutaway perspective view of a portion of an embodiment of the infant seat according to the present disclosure.

Referring now to FIG. 2, an access opening 200 on a side of frame 112 is illustrated. Access opening 200 permits communication with a backside of a mounting plate 120, to permit fastening devices to be passed through openings 114. With through openings 114 permitting attachment of frame 112 to the shopping cart, mounting plate 120 serves as a rigid surface for securing infant seat 100 in a given location against the shopping cart.

Figure 3:
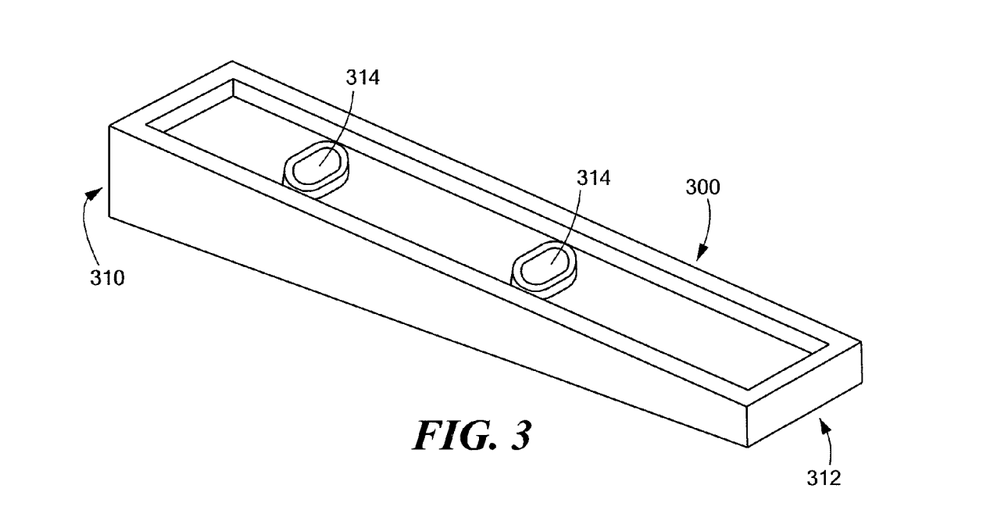
FIG. 3 is a perspective view of an exemplary wedge according to the present disclosure.

Referring now to FIG. 3, a wedge 300 that can be used to mount infant seat 100 to a shopping cart is illustrated. Wedge 300 is shaped to have an inclination such that a thickness of wedge 300 is greater at end 310 than at end 312. Wedge 300 includes through openings 314 that are spaced apart a distance that corresponds to the distance between openings 114 on infant seat 100. The distance between openings 314 is also the same as that between openings 116 on infant seat 100. In addition, openings 314 are elongated, or oval in shape to permit a range of adjustment for a fastener, similar to the function of the oval shape of openings 116. Therefore, a fastener that can be located over a range using through openings 116 is not limited in the range by being passed through openings 314 of wedge 300.

Figure 4:
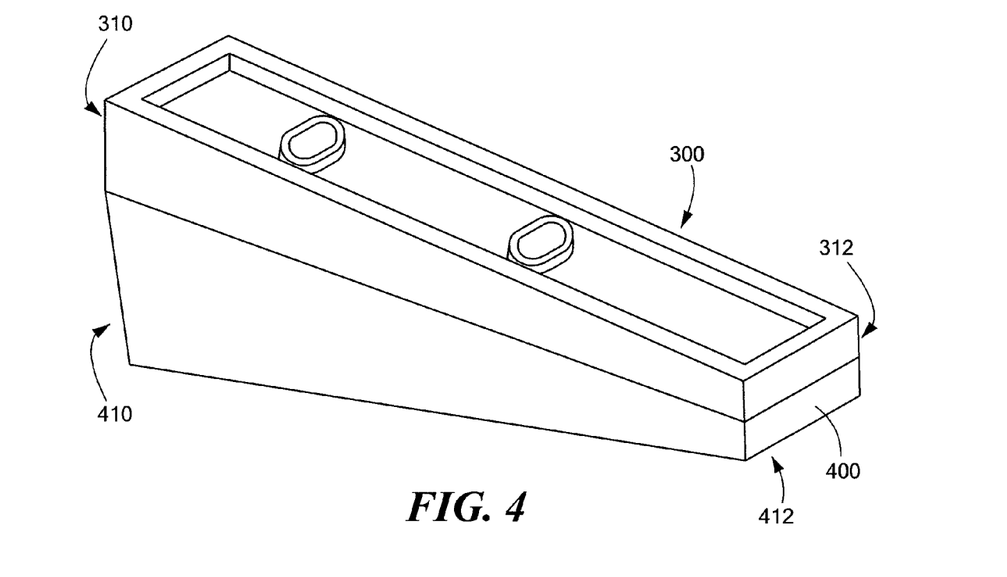
FIG. 4 is a perspective view of an exemplary combination of wedges in accordance with the present disclosure.

Referring now to FIG. 4, wedge 300 is illustrated atop another wedge 400 having a similar shape and design as wedge 300. Wedge 400 has a greater thickness at end 410 than at end 412 to provide an inclined angle or taper for wedge 400. The combination of wedges 300 and 400 in a stacked or abutting arrangement provide a greater angle at which infant seat 100 can be mounted than either of wedges 300 or 400 used alone. The orientation of wedges 300, 400 may be reversed, so that thinner end 312 of wedge 300 can be matched up with thicker end 410 of wedge 400 and vice versa. For example, wedge 300 can be turned 180 degrees with respect to its orientation in FIG. 4 and aligned with wedge 400 to form a combination wedge arrangement. Such an arrangement where thin ends are matched up with thick ends produces a combination wedge arrangement that has a lesser combined angle than that of either of wedge 300 or 400 alone. Accordingly, by providing wedges 300, 400 or additional combinations of wedges with differing angles of inclination, a variety of mounting angles for infant seat 100 can be attained when individual wedges or a combination wedge arrangement is used to mount infant seat 100.

Figure 5:
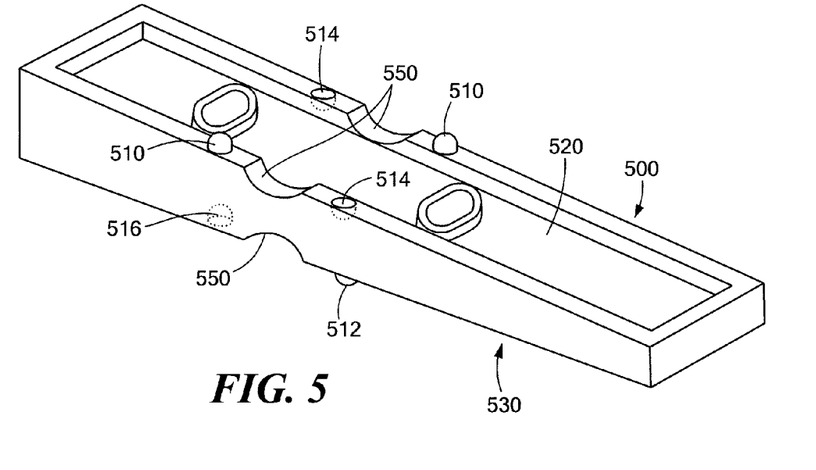
FIG. 5 is a perspective view of an embodiment of a wedge according to the present disclosure.
Figure 6:
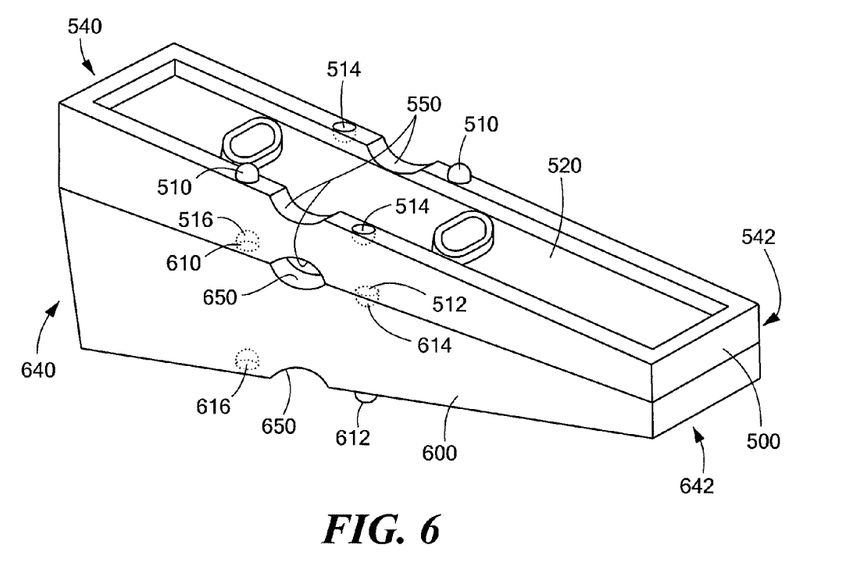
FIG. 6 is a perspective view of an embodiment of a combination of wedges according to the present disclosure.

Referring now to FIGS. 5 and 6, wedges 500, 600 are illustrated with engagement structures for maintaining the wedges in a given position in relation to each other, or in relation to infant seat 100 or the shopping cart to which they are mounted. Wedge 500 has protrusions 510 and 512 that are arranged on opposite main surfaces of wedge 500. Protrusions 510 and 512 are arranged to have substantially similar size and shape so that they can be interchangeable in form or function, depending upon the orientation of wedge 500. For example, wedge 500 can be oriented to have a side 520 arranged to be directly adjacent to plate 120 of infant seat 100 to mount infant seat 100 to the shopping cart. Alternately, wedge 500 can be oriented to have a side 530 that opposes side 520 on an opposite side of wedge 500 be directly adjacent to plate 120 when infant seat is mounted to the shopping cart.

Wedge 500 also includes recesses 514, 516 that are arranged to be complementary with respective protrusions 510 or 512 from another wedge 500. Protrusion 510 or 512 from another wedge 500 can thus engage recesses 514 or 516 in different orientations. Wedge 500 has another recess 516 (not shown) on side 530 located in opposition to protrusions 510. With the arrangement of complementary protrusions 510, 512 and recesses 514, 516, a number of wedges 500 can be arranged in different orientations in combination, while engaging with each other to provide a suitable mounting angle for mounting infant seat 100 to a shopping cart.

Referring also to FIG. 6, wedge 500 is shown engaged with another wedge 600 that is formed to have a different angle of inclination than that of wedge 500. Protrusions 512 of wedge 500, are shown engaging in recesses 614 of wedge 600, while protrusions 610 engage with recesses 516 to maintain wedges 500 and 600 in a relative position in relation to each other. The combination of angles of inclination provided by wedges 500 and 600 is greater than the angle of inclination for either of wedges 500 or 600 alone.

Wedges 500 and 600 can be combined to obtain a different angle than that obtained with the configuration illustrated in FIG. 6. For example, wedge 500 can be flipped over and/or rotated 180° to be oriented to have opposing ends 540, 542 of wedge 500 be reversed in orientation. In such an orientation, a thicker width of wedge 500 at end 540 is located adjacent a thinner width of wedge 600 at end 642. Likewise, the thinner width of end 542 is oriented to be adjacent to the thicker width of end 640 of wedge 600. With such an orientation, the combined angle of inclination of wedges 500 and 600 can be less than the angle of inclination of either of 500 or 600 taken alone.

Protrusions 610 and 612 of wedge 600 have locations, shapes and sizes that correspond to protrusions 510 and 512 of wedge 500. Similarly, recesses 614 and 616 of wedge 600 have locations, shapes and sizes that correspond to recesses 514 and 516 of wedge 500. Protrusions 510, 512 can be received within corresponding recesses 514, 516 of another wedge 500, or within recesses 614, 616 of wedge 600, interchangeably, to permit wedges 500 and 600 to be engaged in a variety of orientations. Likewise, protrusions 610, 612 can be received within recesses 614, 616 of another wedge 600, or can be received within recesses 514, 516 of wedge 500 interchangeably, so that multiple combinations of wedges that have the same or different angles of inclination can be realized. Moreover, combinations of three wedges of the same or different angles of inclination in similar or different orientations can be used.

It should be apparent that the configuration of protrusions and recesses shown in FIGS. 5 and 6 discussed above are one of many possible configurations for engagement structures that permit wedges to engage with each other whether they have the same or different angles of inclination. For example, wedges may be joined together with a clip or other fastener, and the assembly used to mount infant seats 100. Moreover, infant seat 100 can be provided with engagement structures to cooperatively engage corresponding structures on wedges 500 or 600, for example. In addition, referring to FIGS. 5 and 6, recesses 550, 650 respectively located on wedges 500, 600 can be used to receive a portion of a shopping cart, such as a wire or bar for mounting wedges 500 or 600 with infant seat 100. That is, wedges 500 or 600 can be configured to engage a portion of the shopping cart to which infant seat 100 is mounted using wedges 500 or 600. Recesses 550 or 650 may also be used to receive a corresponding structure on infant seat 100 to help locate or mount wedges 500 or 600 to infant seat 100. In general, wedges 500 or 600 can be configured to engage with each other in a number of different orientations, as well as engage with infant seat 100 or the shopping cart to which it is mounted. A variety of well known fasteners, structures, or engagements may be used to achieve such a configuration for mounting infant seat 100 to a shopping cart using wedges 500 or 600.

Referring now to FIG. 7, infant seat 100 is illustrated with wedges 300 installed adjacent to plate 120. Wedges 300 are located between infant seat 100 and the shopping cart to which it is mounted to establish a desired mounting angle for infant seat 100. U-bolts 710 are used as fasteners to mount infant seat 100 to the shopping cart. U-bolts 710 pass through openings 314 of wedges 300 in position relative to infant seat 100 and the shopping cart. U-bolts 710 are passed around a section of the shopping cart, through openings 314 of wedges 300 and through openings 114, 116 (FIG. 1) and fastened with threaded nuts (not shown) to mount infant seat 100 to the shopping cart.

The implementation of an adjustable mounting angle for mounting infant seat 100 to the shopping cart can also be achieved by providing an integral mounting angle device for adjusting a mounting angle of infant seat 100 mounted to the shopping cart. For example, a hinged mounting device (not shown) can be used at an infant seat mounting site, such as at a fastening structure exemplified by through openings 114, 116 or on mounting plate 120. The hinged device can be adjusted to protrude beyond through openings 114, 116 or mounting plate 120 a variable amount by being pivoted about the hinge. The hinged device can then be secured in place with the desired amount of protrusion using a fastener (not shown) that may or may not be integral with infant seat 100. When the hinged device is secured with the desired amount of protrusion, it provides a mounting angle for infant seat 100 in conjunction with being mounted on a shopping cart.

Figure 8:
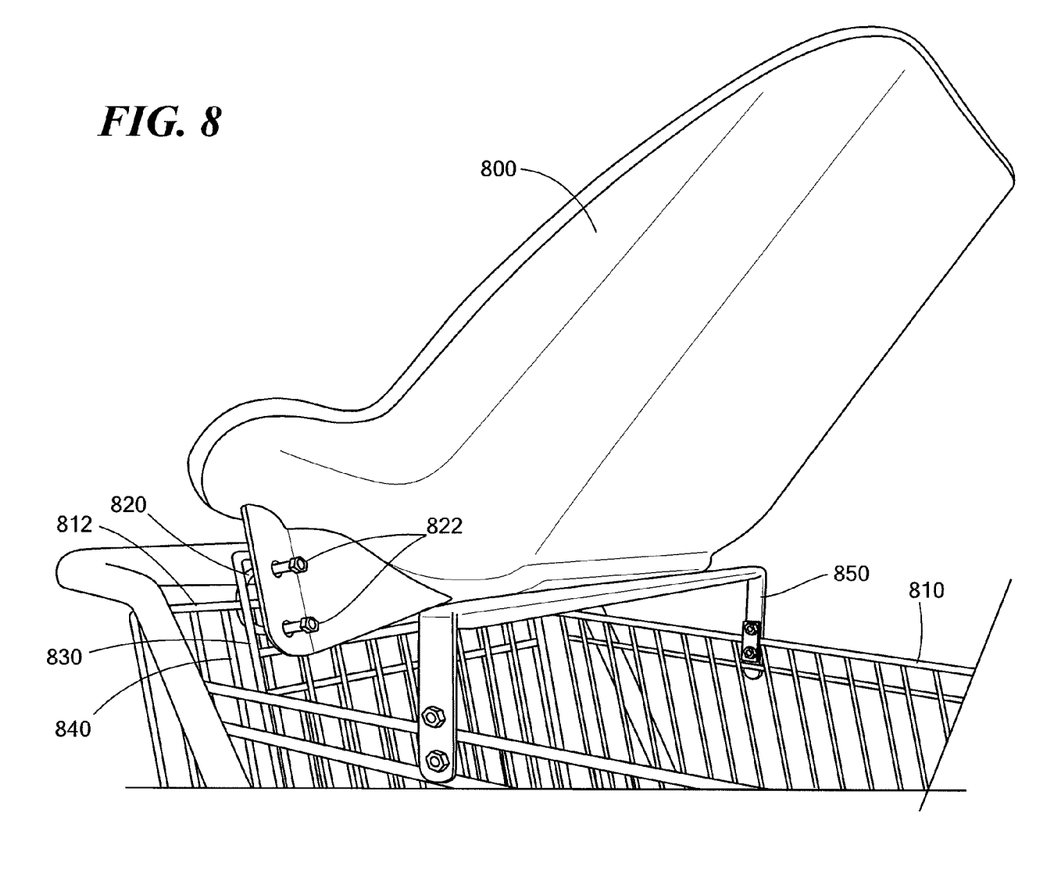
FIG. 8 is a perspective view of an embodiment of an infant seat showing a mounting angle indication in accordance with an embodiment of the present disclosure.

Referring to FIG. 8, an embodiment of an infant seat 800 is illustrated mounted on a shopping cart 810. Infant seat 800 is mounted to shopping cart 810 with U-bolts that encircle a pivot bar 812 of shopping cart 810. U-bolt 820 encircles pivot bar 812 through a portion of a collapsible seat back 830. U-bolt 820 is fastened with nuts 822 that are screwed on to the threaded ends of U-bolt 820.

Because infant seat 800 is mounted to shopping cart 810 at pivot bar 812, infant seat 800 can pivot with a gate 840, which can pivot around pivot bar 812 to permit shopping cart 810 to nest with other shopping carts, without interference from infant seat 800. As shown in FIG. 8, an optional mounting bar 850 can be employed to support infant seat 800 on shopping cart 810. Support bar 850 is mounted to shopping cart 810 to be free and clear of gate 840 when gate 840 pivots into an upper position to permit nesting of shopping cart 810 with other shopping carts. When gate 840 pivots into a down position when shopping cart 810 is not nested with other shopping carts, infant seat 800 can be supported on support bar 850 to provide additional support for infant seat 800.

Figure 9:
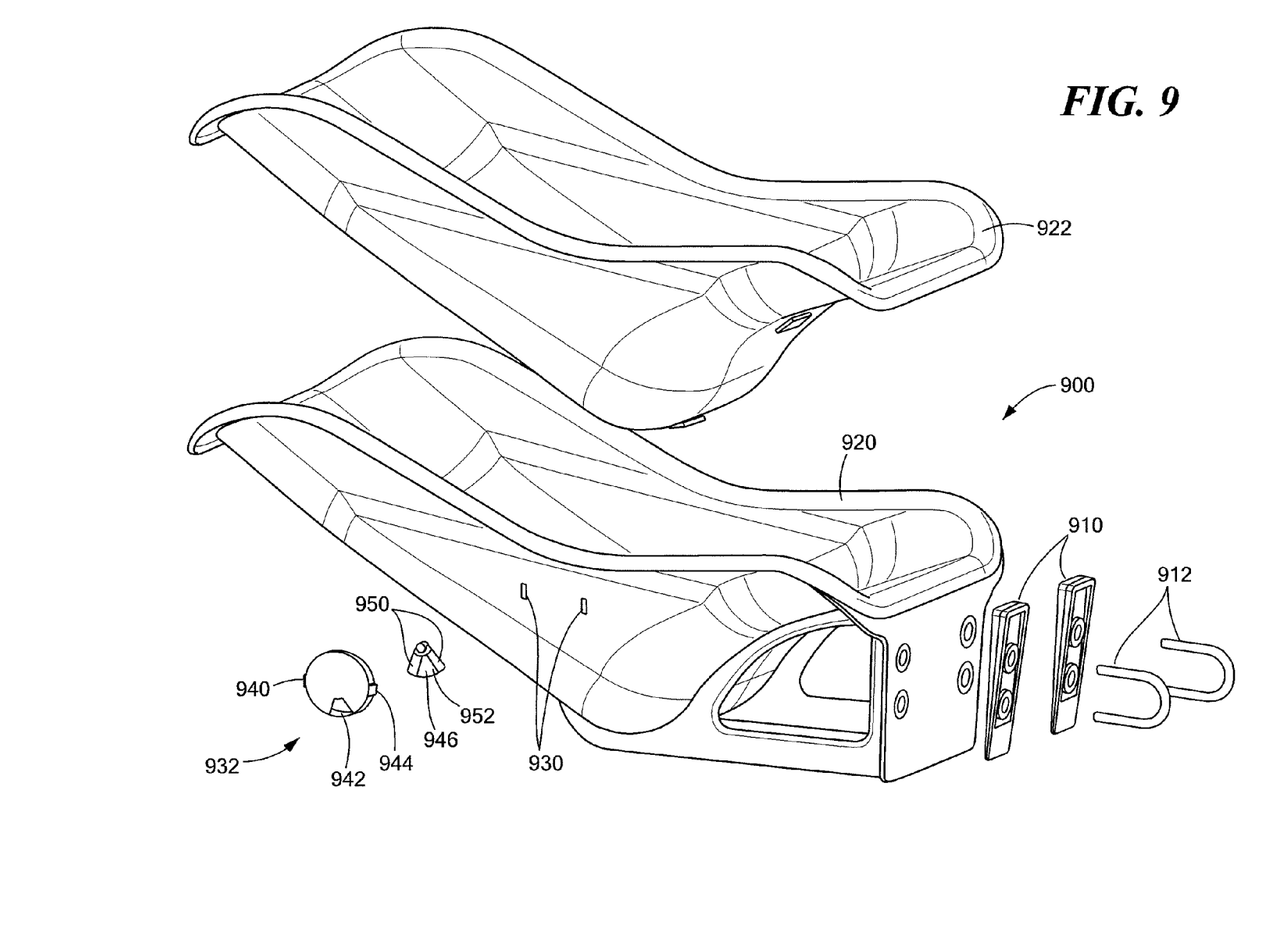
FIG. 9 is an exploded perspective view of an embodiment of the infant seat.

Referring now to FIG. 9, an exploded perspective view of an infant seat 900 with wedges 910 and U-bolts 912 is illustrated. Infant seat 900 includes a frame 920, upon which a seat covering 922 is over-molded. Frame 920 may be composed of any type of suitable material such as, for example, polyethylene or other weather resistant material. Seat covering 922 may be composed of foam rubber that is over-molded onto frame 920 to provide a resilient, pliable surface for supporting an infant. In accordance with an exemplary embodiment, frame 920 includes slots 930 that are positioned at specific locations on a side of frame 920. Slots 930 represent a leveling indicia or structure used to determine an appropriate mounting angle for infant seat 900. Slots 930 thus form an orientation tool for determining an appropriate mounting angle for infant seat 900.

An angular reference or leveling device may be used in conjunction with slots 930 to determine or verify an appropriate mounting angle. For example, a leveling device 932 in the form of a housing 940 having a window 942 may be used in conjunction with a gauge indicator 946 to determine if infant seat 900 is positioned at a desired mounting angle. Gauge indicator 946 is received within housing 940 in a pivoting relationship such that indicator portions 950 or 952 can be visible through window 942 when gauge indicator 946 pivots within housing 940. Housing 940 has pegs 944 on either side of housing 940 that cooperate with slots 930 to permit housing 940 to be mounted to the side of frame 920.

Gauge indicator 946 is pivotally mounted within housing 940 when housing 940 is arranged on the side of frame 920 through cooperation of pegs 944 with slots 930. Infant seat 900 may then be positioned on the shopping cart and secured with U-bolts 912 that pass through wedges 910 such that infant seat 900 is mounted to the shopping cart at a mounting angle produced by the presence and orientation of wedges 910. Indicator gauge 946 pivots within housing 940 and can be visible through window 942 to indicate if the mounting angle for infant seat 900 is within a desirable range.

For example, indicator section 952 of gauge indicator 946 may be visible through window 942, while indicator sections 950 are blocked from view by housing 940. In such an instance, infant seat 900 is deemed to be mounted at a desired angle. If indicator sections 950 are visible through window 942, the mounting angle for infant seat 900 may be deemed greater or less than the desired range for an appropriate or desired mounting angle. When the mounting angle of infant seat 900 is outside the desired range, as may be indicated with gauge indicator 946 used in conjunction with housing 940, wedges that have different angles of inclination may be used in different orientations, or in different combinations with other wedges, to obtain a mounting angle for infant seat 900 that is within the desired range. By selecting and installing different wedges with different angles of inclination, or combinations of wedges, including combinations with wedges of different orientations, a desired mounting angle for infant seat 900 can be obtained. The mounting angle can be checking and/or verified using the mounting angle indication as provided by the combination of housing 940, gauge indicator 946 and slots 930. Alternately, or in addition, slots 930, or other indicia, can be employed with other angular references or tools, such as a level or plumb bob, to obtain a desired mounting angle for infant seat 900 in conjunction with the indicia provided on frame 920, for example.

When a mounting angle adjustment device is integral with infant seat 900, such as by employing the hinged protrusion described above, the integral device can be adjusted while infant seat 900 is mounted to the shopping cart. The mounting angle can be adjusted while infant seat 900 is in place, using a guide such as leveling device 932. In addition, leveling device 932 can be integrally incorporated into infant seat 900. As such, leveling device 932 can be used to adjust a mounting angle, and remain with infant seat 900 to indicate a mounting angle in use. Such an indication can contribute to verifying mounting angle at a glance, and permit a rapid maintenance check for infant seat 900 mounted to the shopping cart.

The foregoing description has been directed to particular embodiments of the present invention. It will be apparent, however, that other variations and modifications my be made to the described embodiments, with the attainment of some or all of their advantages. Therefore, it is the object of the appended claims to cover all such variations and modifications as come within the true spirit and scope of the invention.

What is claimed is:

1. An apparatus for carrying an infant on a shopping cart, comprising:
   a seat section for receiving an infant that includes a seat back and a seat bottom for supporting the infant, the seat bottom having a front edge and a rear extent, the rear extent being adjacent to the seat back;
   a mounting member attached to the seat section and arranged at and below the front edge of the seat section, the mounting member including fastening structures for fastening the mounting member to a section of the shopping cart thereby permitting the infant seat to be mounted to the shopping cart; and
   a removably attachable angular adjustment device that provides a predetermined mounting angle for the infant seat on the shopping cart and being removably attached between the mounting member and the section of the shopping cart to which the mounting member is fastened.

2. The apparatus according to claim 1, wherein the seat section further comprises:
   a seat frame connected to the mounting member and having a contour describing the seat back and seat bottom; and
   a seat pad over-molded onto the seat frame to have a contour matching that of the seat frame to cover the seat back and seat bottom.

3. The apparatus according to claim 2, wherein the seat pad is composed of a weather resistant foam rubber.

4. The apparatus according to claim 2, wherein the seat frame is composed of a weather resistant plastic.

5. The apparatus according to claim 4, wherein the seat frame is polyethylene.

6. The apparatus according to claim 1, wherein the fastening structures are through openings suitable for receiving a fastener.

7. The apparatus according to claim 1, wherein the angular adjustment device is integral with the mounting member.

8. The apparatus according to claim 1, wherein the angular adjustment device is a wedge that can be located on the mounting member in different orientations to obtain different mounting angles.

9. The apparatus according to claim 8, wherein the wedge further comprises one or more engagement structures that are complimentary with one or more engagement structures on the mounting member.

10. The apparatus according to claim 1, wherein the angular adjustment device is a combination of wedges such that an angle of inclination produced by the combination of wedges results in a desired mounting angle when the combination of wedges are located between the mounting member and the section of the shopping cart when the mounting member is fastened to the section of the shopping cart.

11. The apparatus according to claim 10, wherein one or more wedges in the combination of wedges further comprise at least one engagement structure that can cooperatively engage a corresponding engagement structure of another wedge in the combination of wedges to contribute to maintaining the combination of wedges in a desired relative orientation.

12. The apparatus according to claim 1, further comprising mounting angle indicia on one or more of the seat section or mounting member for indicating a desired mounting angle for fastening the infant seat to the shopping cart.

13. The apparatus according to claim 12, wherein the mounting angle indicia further comprises a plurality of slots arranged along a given line.

14. The apparatus according to claim 13, further comprising a level indication gauge that can be aligned with the angle indicia to contribute to determining the desired mounting angle.

15. The apparatus according to claim 12, further comprising a level indication gauge that can be aligned with the angle indicia to contribute to determining the desired mounting angle.

16. An infant carrier, comprising a shopping cart on which is mounted the apparatus for carrying an infant according to claim 1.

17. The carrier according to claim 16, wherein the apparatus for carrying an infant is mounted to a pivoting gate portion of the shopping cart to permit the pivoting gate portion to freely pivot to a shopping cart nestable position without interference from the apparatus for carrying an infant.

* * * * *